United States Patent [19]

Moorehead

[11] 3,920,933

[45] Nov. 18, 1975

[54] STATUS DETECTOR FAULT DETECTOR

[75] Inventor: Thomas J. Moorehead, Brockville, Canada

[73] Assignee: GTE Automatic Electric (Canada) Limited, Brockville, Canada

[22] Filed: Sept. 27, 1974

[21] Appl. No.: 510,110

[52] U.S. Cl. .................. 179/175.2 C; 179/175.2 R

[51] Int. Cl.² .......................................... H04M 3/24

[58] Field of Search ...... 179/175.2 C, 175, 175.3 R, 179/175.2 R; 340/248 C; 324/133

[56] References Cited

UNITED STATES PATENTS

| | | | |
|---|---|---|---|
| 2,956,229 | 10/1960 | Henel | 179/175 |
| 3,333,188 | 7/1967 | Eagle | 324/133 |
| 3,600,678 | 8/1971 | Garrett | 179/175 |
| 3,617,879 | 11/1971 | Mugnier | 324/133 |
| 3,746,981 | 7/1973 | Stone | 324/133 |
| 3,772,663 | 11/1973 | Shaver | 340/174 M |
| 3,790,790 | 2/1974 | Norman | 324/133 |

*Primary Examiner*—Douglas W. Olms
*Attorney, Agent, or Firm*—John T. Winburn

[57] ABSTRACT

Three diodes on the input of a fault detector are coupled to the output of a status detector driver to clamp the output of the status detector driver positive with respect to ground. A fault detector amplifier is coupled to the diodes through a resistor and capacitor filter to eliminate transients. The amplifier normally produces a low output signal. This low signal back biases a diode at the input of the status detector driver and a second diode at the input of an error signal producing circuit. The error signal producing circuit comprises a normally on transistor. A foreign potential at the output of the status detector driver is detected by the fault detector amplifier which will then produce a high output signal. This will forward bias the diode in the status detector driver circuit turning the status detector driver circuit off, and also turning off the transistor in the signal producing circuit to produce an error signal. Resistors are included in series with the sense point matrix diodes to protect them from a high current. Diodes are provided at the input of the receiver to also protect the receiver from foreign potentials.

3 Claims, 1 Drawing Figure

STATUS DETECTOR FAULT DETECTOR

CROSS-REFERENCE TO RELATED APPLICATIONS

This invention is incorporated in the Status Detector by Moorehead, Ser. No. 510,251, filed the same day as this application.

BACKGROUND OF THE INVENTION

1. Field of the Invention

The invention relates to the detection of foreign potentials for a status detector in a telephone communication switching system, and more particularly to detect a negative potential, produce an error signal, and shut off the faulty subsystem.

2. Description of the Prior Art

The invention was developed for the system shown in U.S. Pat. No. 3,767,863, issued Oct. 23, 1973, by Borbas et al. for a Communication Switching System with Modular Organization and Bus, hereinafter referred to as the System S2 patent.

A previous system is described in U.S. Pat. No. 3,487,173, issued Dec. 30, 1969, by Duthie et al. for a Small Exchange Stored Program Switching System, hereinafter referred to as the System S1 patent. An improved status detector arrangement for System S1 is disclosed in U.S. Pat. No. 3,772,663, issued Nov. 13, 1973, by Shaver for a Status Detector and Memory Arrangement.

In these previous designs the status detector hardware was associated with the ring core memory access drivers and receivers. The status detector hardware itself did not contain any protection. As a result when either of the two most likely conditions occurred, −50 volts shorts in the equipment and unintentional grounds, hardware was actually destroyed. The status detector drivers of the system which were also the memory access drivers generated negative pulses which did not allow detection of foreign potentials before the hardware became destroyed. Also because of the association with the memory any of these faults were extremely difficult to isolate since the memory effectively became faulty at the same time. These systems also do not provide the protection for the status detecting receiver or for the matrix sense point diodes.

The System S2 status detector was made a separate unit separate from the memory circuitry. In doing so it became a separate module on the bus. Experience gained from previous S1 designs left no doubt protection for its hardware was necessary. The status detector drivers of this system were designed to generate positive pulses to facilitate the protection.

SUMMARY OF THE INVENTION

According to the invention, the status detection driver output is clamped positive by diodes in the fault detection circuit. A fault detection amplifier is coupled to the diodes and normally produces a low potential back biasing a diode provided at the input of the error signal generator and a diode coupled to the input of the status detector driver. A negative potential occurring at the status detector driver output will be sensed by the fault detection amplifier, the amplifier will turn off producing a high to the signal generation circuit, and also a high through the diode to the input of the status detector driver which will shut the status detector driver off. The high in the error signal generation circuit turns off a normally on transistor which produces a low output which may be detected by the status detector control. A resistor for current limitation is added to the matrix sense point diode circuit to protect that diode, and a diode is provided for the receiver to protect the receiver circuitry.

The first object of the invention is to protect the status detector hardware from foreign potentials.

A second object of the invention is to hold the output of the status detector driver at a potential positive with respect to ground.

A third object of the invention is to shut off a status detector driver if a foreign potential is sensed.

A fourth object of the invention is to produce an error signal when a foreign potential is sensed.

A fifth object of the invention is to provide foreign potential protection for the receiver of the status detector.

A sixth and final object of the invention is to provide foreign potential protection for the sense point matrix diodes.

BRIEF DESCRIPTION OF THE DRAWING

The above-mentioned and other features and objects of this invention and the manner of obtaining them will become more apparent, and the invention itself will be best understood by reference to the following description of an embodiment of the invention taken in conjunction with the accompanying drawing, in which:

The single FIGURE is a schematic diagram of the fault detection system.

DESCRIPTION OF THE PREFERRED EMBODIMENT

Figure 1:
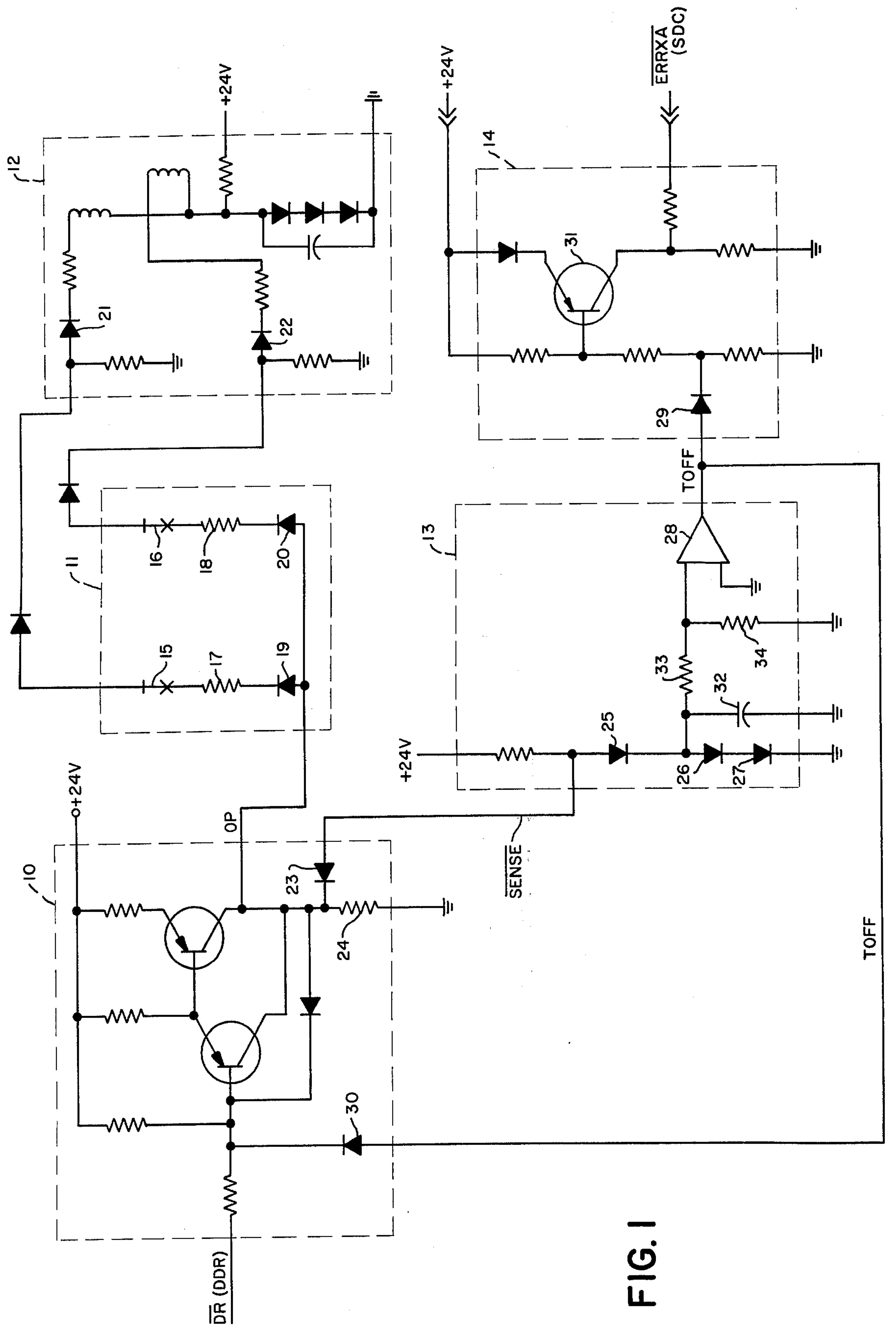

The FIGURE shows the fault detection circuitry and its connection to the subsystem of a particular status detector system. As shown, the status detector driver (SDD) 10 produces a positive output signal OP which is coupled to the sense points in the peripheral unit 11. The sense points in peripheral unit 11 may typically be line circuits, originating junctors (OJ), terminating junctors (TJ), and register junctors (RJ). The sense contacts 15 and 16, matrix diodes 19 and 20, and current limiting resistors 17 and 18 are shown. As there are a multiplicity of these sense points, matrix diodes 19 and 20 allow a particular one to be picked out as is conventionally known. Resistors 17 and 18 are provided to limit the current through diodes 19 and 20 to protect these diodes from foreign potentials. The output from the sense points in peripheral unit 11 is then fed into receiver 12. Diodes 21 and 22 are provided in the receiver to protect the receiver circuitry from negative foreign potentials. Fault detector circuit 13 contains diodes 25–27. In the steady state normal operating condition, the diodes 25–27 along with diode 23 in the status detector driver bias the status detector output signal OP approximately two diode drops above ground (25 + 26 + 27 − 23). In this steady state, amplifier 28 is normally producing a low potential on the TOFF lead which back biases diode 29 in the error signal producing circuit 14 and diode 30 at the input to the status detector driver circuit. This low potential will have no other effect on the circuit. The slight bias on signal OP is insufficient to overcome the sense point matrix diodes and the diodes 21 and 22 in the receiver. Further details of a status detector system including the SDD, decoder driver (DDR), receiver and including the status detector control (SDC) are shown in the above-mentioned co-pending application to Moorehead for a Status Detector.

In normal operation, after decoding has taken place in the status detector, a low is produced by the DDR at the $\overline{DR}$ input of the SDD. This produces a high at the SDD output (OP). The pulse duration from DDR is approximately 9 microseconds, and if continuity is present through the particular sense point the output will saturate the pulse transformer in the receiver (RVR). The positive pulse forward biases diodes 21 and 22 to saturate the pulse transformer so the status may be recorded. The positive pulse OP back biases diode 23 and therefore has no effect on the fault detection circuitry 13.

If at any time −50 volt is shorted to the circuitry between the output of the SDD and the diodes 21 and 22 in the receiver, the OP wiring will go below ground, forward biasing diode 23 which produces signal $\overline{SENSE}$ and lowers the bias point between diodes 25 and 26. Capacitor 32 and resistors 33 and 34 form a filter to eliminate any transients in the circuitry to eliminate false outputs from the fault detector. If the signal remains, amplifier 28 will turn off and signal lead TOFF is pulled high. This will forward bias diode 30 at the input to the SDD which will pull the input to SDD high and turn the SDD off. The high at TOFF also forward biases diode 29 and the error signal producing circuit 14. This will turn off the normally on transistor 31 and produce a low signal $\overline{ERRXA}$ output which is detected and stored in the SDC of the status detector where the central processor may see it. The same error indication will be given if a fault detection circuit is itself faulty or if the SDD is is pulled out of the circuitry, or becomes loose in a card slot.

If the −50 volt foreign potential is between the sense points in the peripheral unit 11 and the diodes 21 and 22, diodes 21 and 22 are back biased and no current will flow. The sense point is forward biased, however even if the SDD is on, resistors 17 and 18 will limit the current and protect the matrix diodes of the sense points. The SDD of course should not be able to turn on under this condition. If the −50 volt foreign potential is between the SDD and the sense points, the sense points are back biased by diodes 19 and 20.

A ground will cause the same actions if it occurs between the SDD and the sense points. A ground on the receiver side of the sense points will not be detected if it is a poor ground, as there are too many diode drops. This problem is detected using an all call for service test to the central processor by the status detector. This particular short will cause no hardware damage, because of its location, but it will prevent the pulse transformer from saturating and the status of the sense point from being detected.

While principles of the invention have been illustrated above in connection with specific apparatus and applications, it is to be understood the description is made only by way of example and not as a limitation on the scope of the invention as encompassed by the following claims.

I claim:

1. A fault detection system for a status detector of a communication switching system, said status detector including a detector driver signal, a status detector driver, a status detector control, peripheral unit sense points, and a status detector receiver, said fault detection system comprising:

negative potential detection means coupled to said status detector driver for producing a signal to turn off said status detector driver when a negative potential is detected;

error signal generating means coupled to said negative potential detector means; and sense point protection means;

whereby when a negative potential occurs at said negative potential detection means said status detector driver is turned off and an error signal is produced.

2. A fault detection system as claimed in claim 1 further including:

receiver protection means.

3. A fault detection system as claimed in claim 1 wherein said negative potential detection means comprises:

diode means coupled to said status detector driver;

amplifier means input coupled to said diode means and output coupled to said error signal generating means and to the input of said status detector driver;

whereby when said amplifier means senses a negative potential a signal will be generated to activate said error signal generation means and to shut off said status detector driver.

* * * * *